(12) United States Patent
Taglialatela-Scafati et al.

(10) Patent No.: US 7,299,123 B2
(45) Date of Patent: Nov. 20, 2007

(54) METHOD AND DEVICE FOR ESTIMATING THE INLET AIR FLOW IN A COMBUSTION CHAMBER OF A CYLINDER OF AN INTERNAL COMBUSTION ENGINE

(75) Inventors: Ferdinando Taglialatela-Scafati, Giugliano (IT); Nicola Cesario, Casalnuovo di Napoli (IT); Pasquale Cassese, Marigliano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 4 days.

(21) Appl. No.: 11/367,805

(22) Filed: Mar. 3, 2006

(65) Prior Publication Data
US 2006/0225710 A1   Oct. 12, 2006

(30) Foreign Application Priority Data
Mar. 4, 2005   (EP)   ................... 05425121
Mar. 1, 2006   (EP)   ................... 06110557

(51) Int. Cl.
G06F 19/00   (2006.01)
F02M 37/04   (2006.01)
(52) U.S. Cl. ....................... 701/114; 123/486
(58) Field of Classification Search ................ 701/101, 701/103, 114, 115; 123/434, 435, 486, 494; 73/118.2; 702/58, 59, 116, 182, 183, 186
See application file for complete search history.

(56) References Cited

U.S. PATENT DOCUMENTS

| 4,920,789 A | 5/1990 | Gomez et al. ............. 73/118.2 |
| 4,962,739 A | 10/1990 | Wataya ....................... 123/435 |
| 5,140,850 A | 8/1992 | Ellmann et al. ........... 73/118.2 |
| 5,974,870 A * | 11/1999 | Treinies et al. ............. 73/118.2 |
| 2004/0096375 A1* | 5/2004 | Cesa ...................... 422/186.04 |
| 2004/0226354 A1* | 11/2004 | Schmidt .................... 73/118.1 |
| 2006/0212209 A1* | 9/2006 | Cesario et al. .............. 701/106 |
| 2006/0235604 A1* | 10/2006 | Taglialatela-Scafati et al. .. 701/109 |

FOREIGN PATENT DOCUMENTS

| DE | 29923272 | 10/2000 |
| JP | 59221433 | 12/1984 |
| WO | WO2004048761 | 6/2004 |

OTHER PUBLICATIONS

"Cylinder Air/Fuel Ratio Estimation Using Net Heat Release Data", Tunestal et al; IFAC Workshop on Advances in Automotive Control, Mar. 28, 2001, pp. 239-247, XP001032740.
"Cylinder Air/Fuel Ratio Estimation Using Net Heat Release Data", Tunestal et al; Control Engineering Practice, Pergamon Press, Oxford, GB, vol. 11, No. 3, 2003, pp. 311-318, XP001157572, ISSN: 0967-0661.

* cited by examiner

*Primary Examiner*—John T. Kwon
(74) *Attorney, Agent, or Firm*—Lisa K. Jorgenson; Allen, Dyer, Doppelt, Milbrath & Gilchrist, P.A.

(57) ABSTRACT

A reliable method of sensing the inlet air flow in a combustion chamber of a cylinder of an internal combustion engine includes assessing the inlet air flow with soft-computing techniques basically exploiting a combustion pressure signal generated by a pressure sensor installed in the cylinder.

11 Claims, 9 Drawing Sheets

METHOD AND DEVICE FOR ESTIMATING THE INLET AIR FLOW IN A COMBUSTION CHAMBER OF A CYLINDER OF AN INTERNAL COMBUSTION ENGINE

FIELD OF THE INVENTION

This invention relates to internal combustion engines, and, more particularly, to a method and associated device for sensing the inlet mass air flow (briefly MAF) in a cylinder of an internal combustion engine, and an associated control system that uses this sensing device.

BACKGROUND OF THE INVENTION

In the feedforward part of an SI (Spark Ignition) engine Air/Fuel control system, the in-cylinder mass air flow rate has to be accurately estimated to determine the fuel amount to be injected. Generally, this evaluation is performed either with a dedicated sensor (MAF sensor) or with an indirect evaluation based on the speed-density method.

In order to meet the stricter and stricter emission regulations, automobile gasoline engines are equipped with a three-way catalytic converter (TWC). A precise control of air-fuel ratio (A/F) to the stoichiometric value is necessary to achieve a high efficiency of the TWC converter in the conversion of the toxic exhaust gases (CO, NOx, HC) into less harmful products ($CO_2$, $H_2O$, $N_2$). Typically, this control is performed in a spark-ignition engine through a so-called lambda sensor. The lambda sensor generates a signal representative of the value of the ratio $$\lambda = \frac{Air/Fuel}{Air/Fuel_{stoichiometric}}$$

from the amount of oxygen detected in the exhaust gas mixture. If $\lambda<1$ the mixture is rich of fuel, while if $\lambda>1$ the mixture is lean of fuel.

In order to keep the air/fuel ratio (AFR) as close as possible to unity, the lambda sensor is inserted in the outlet of exhaust gases for monitoring the amount of oxygen in the exhaust gases. The signal generated by the lambda sensor is input to the controller of the engine that adjusts the injection times and thus the fuel injected during each cycle for reaching the condition $\lambda=1$.

Traditional Air/Fuel control strategies include a feedforward part in which the amount of fuel to be injected is calculated on the basis of the in-cylinder mass air flow and a feedback part which uses the signal of an oxygen sensor (lambda sensor), located in the exhaust system, to ensure that the Air/Fuel will remain in the neighborhood of the stoichiometric value [1].

FIG. 1 shows a block diagram of a traditional Air/Fuel control system. Generally, the feedback part of the Air/Fuel control system is fully active only in steady-state conditions; moreover the lambda sensor signal is available only after this sensor has reached a fixed operating temperature. In transient and cold start conditions the feedback control is disabled, thus the feedforward part of Air/Fuel control is particularly important.

As mentioned before, the air flow estimation is the basis for calculating the injected fuel quantity in the feedforward part of Air/Fuel control system.

A conventional technique [1] for estimating the cylinder air flow into a SI (Spark Ignition) engine involves the so-called "speed-density" equation:

$$\dot{m}_{ap} = \eta(p_m, N) \cdot \frac{V_d \cdot N \cdot p_a}{120 \cdot R \cdot T_m}$$

where $\dot{m}_{ap}$ is the inlet mass air flow rate, $V_d$ is the engine displacement and N is the engine speed; $T_m$ and $p_m$ are the mean manifold temperature and pressure and $\eta$. is the volumetric efficiency of the engine. This is a nonlinear function of engine speed (N) and manifold pressure ($p_m$), that may be experimentally mapped in correspondence with different engine working points. A standard method is to map the volumetric efficiency and compensate it for density variations in the intake manifold.

One of the drawbacks in using the "speed-density" equation for the in-cylinder air flow estimation is the uncertainty in the volumetric efficiency. Generally, the volumetric efficiency is calculated in the calibration phase with the engine under steady state conditions. However variations in the volumetric efficiency due, for example, to engine aging and wear, combustion chamber deposit buildup etc., may induce errors in the air flow estimation.

Moreover, the low-pass characteristic of commercial sensors (Manifold Absolute Pressure or MAP sensors) used for the determination of the manifold pressure $p_m$, makes the signal affected by a delay which, during fast transients, introduces a relevant error in the air flow estimation.

This problem is not solved by using a faster sensor: in this case the sensor also captures pressure fluctuations due to the valve and piston motion [2]. In engines equipped with an EGR (Exhaust Gas Recirculation) valve, the MAP (Manifold Absolute Pressure) sensor cannot distinguish between fresh air and inert exhaust gas in the intake manifold. Therefore, in this case the speed-density equation (1) cannot be used and the air charge estimation algorithm must provide a method for separating the contribution of recalculated exhaust gas to the total pressure in the intake manifold [4].

An alternative method for the air charge determination is to use a Mass Air Flow (MAF) sensor located upstream from the throttle body, which measures directly the inlet air flow. The main advantages of a direct air flow measurement are [1]: automatic compensation for engine aging and for all factors which modify engine volumetric efficiency; improved idling stability; and lack of sensibility to the system to EGR (Exhaust Gas Recirculation) since only fresh air flow is measured.

Anyway, air flow measurement by means of a MAF sensor (which is generally a hot wire anemometer) accurately estimates the flow in the cylinder only in steady state, while in transients the intake manifold filling/emptying dynamics play a significant role [3], [5]. Moreover, a MAF sensor for commercial automotive applications has a relatively high cost compared to the cost of MAP (Manifold Absolute Pressure) sensor used in the "speed density" approach.

SUMMARY OF THE INVENTION

A reliable alternative method of sensing the inlet air flow in a combustion chamber of a cylinder of an internal combustion engine without using a relatively costly sensor of the prior art and a relative sensing device that implements the method have been found. According to the present invention, the inlet air flow is assessed with soft-computing techniques basically exploiting a combustion pressure signal generated by a common pressure sensor installed in the cylinder.

The applicants have found that there exists a close correlation between the internal cylinder pressure and the inlet mass air flow of the cylinder and thus the former may be used for estimating the latter. The function of the rather expensive inlet mass air flow sensors that are actually deployed in internal combustion engines may be conveniently done by a far less expensive sensing device, without loss of precision and with a significant reduction of costs.

The sensing device may be used for realizing a feedforward controller and a feedback-and-feedforward controller of an internal combustion engine.

By juxtaposing a plurality of feedback-and-feedforward controllers, one for each cylinder of the engine, it is possible to control the inlet air/fuel ratio of each cylinder of a multi-cylinder internal combustion engine. The method may be carried out by a software code executed by a computer.

BRIEF DESCRIPTION OF THE DRAWINGS

Preferred embodiments of the invention will be described referring to the attached drawings, wherein.

DETAILED DESCRIPTION OF THE PREFERRED EMBODIMENTS

A soft computing mass air flow estimator of this invention, capable of estimating both in steady state and in transient conditions the in cylinder mass air flow of a single-cylinder SI engine, basically utilizes a combustion pressure signal of the cylinder. A learning machine, such as for example a MLP (Multi-Layer Perceptron) neural network, trained on the experimental data acquired in different operating conditions of a gasoline engine, was used for realizing the inlet mass air flow sensing device of this invention.

A traditional combustion pressure piezoelectric transducer, or any other low-cost pressure sensor, may provide the required raw information. It has been found that the cylinder combustion pressure is correlated with the inlet mass air flow of the cylinder, thus a signal produced by a combustion pressure sensor is exploited for producing through a soft-computing processing that utilizes information on throttle opening, speed and angular position, a signal representative of the inlet mass air flow.

System Description

Figure 2:
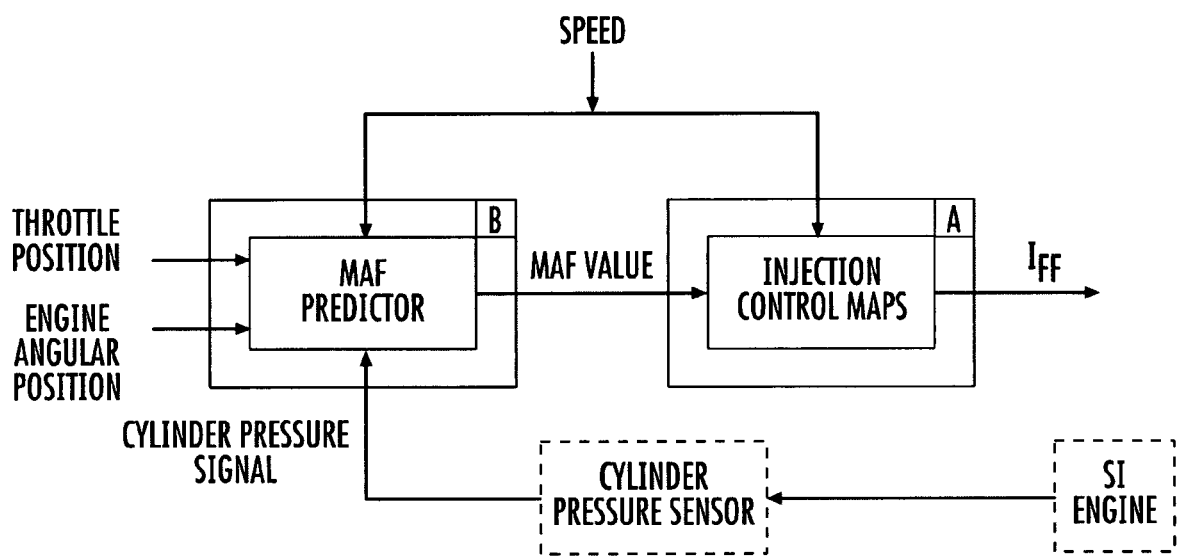
FIG. 2 is a block diagram of the feedforward control system of this invention.

A block diagram of the novel system of air charge estimation in a single-cylinder SI engine is shown in FIG. 2. Basically, the system includes a MAF estimator device, which basically is a model able to estimate the mass air flow as a function of certain parametric features derived from the combustion pressure sensor. The output signal of the MAF estimator is used by an engine management system that uses look-up tables that map working points of the engine ("engine maps") in order to determine the right width of the injection pulse (i.e. $I_{FF}$) that produces the desired air/fuel ratio.

Mass Air Flow Estimator

Correlations between certain features, recognizable by analyzing the in-cylinder pressure signal and the mass air flow values measured by a real MAF sensor were verified.

As shown in FIG. 2, the MAF estimator block has the following inputs: throttle position, that is, the signal coming from the sensor that monitors the throttle opening; speed, that is, the engine speed, commonly evaluated from the signal of a phonic wheel; engine angular position, generally evaluated from the signal of a phonic wheel and the signal coming from a phase sensor; and cylinder pressure signal, that is the signal coming from a combustion pressure sensor.

The output of the MAF estimator block is an estimated value of the mass air flow in a common scale (e.g. [kg/h]). From a mathematical point of view, the MAF estimator block can be described as a learning machine trained to emulate the way of functioning of a common MAF sensor. A learning machine [8], [10], is a model without a structured knowledge of the principles ruling the phenomena described by the model. In other words, a learning machine represents a model which is able to learn only from the data describing the system functionalities, that is, the input-output couples related to the system, operating in different states.

For example, the learning machine disclosed in the European Patent application No. 05,425,121.0, in the name of the same Applicant may be used.

For carrying out simulations, a MLP (Multi-Layer Perceptron) neural network [8] with three inputs and one output has been considered. The choice of all the endogenous parameters of the neural network model, such as the number of hidden layers, the number of neurons for each hidden layer, the type of activation functions, the value of the regularization parameter and so on, should be made for maximizing the "generalized predict capability" of the learning machine (for a more detailed description of this general concept refer to [8, 10]). "Generalized" means that the choice of the endogenous parameters of the model is made to increase the model generalization capability, that is, the capability of predicting unmeasured mass air flow values. In the present context, such a problem corresponds to a minimum searching problem.

The shape of the fitness function that was used is the following:

$$V_0(S_1, S_2, \ldots, S_P) = \frac{1}{N_M} \sum_{i=1}^{N_M} \frac{1}{N} \sum_{k_i=1}^{N} \left[ \lambda_{k_i} - F^i_{(S_1, S_2, \ldots, S_{N_1})}(x^{(k_i)}) \right] \quad (24)$$

where $$N_M = \binom{N+M}{N} \quad (25)$$

Equation (24) is a modification of the "ordinary cross-validation estimate" of endogenous parameters of a neural network (chapter 5 of [8], and [9]) and has also been disclosed in the already cited prior European Patent application No. 05,425,121.0.

In the above equations, $N_M$ is the number of possible choices of a testing set, comprising N elements, and of a training set, comprising M elements, on a total data set made by (N+M) input-output couples. The index $k_i$ labels the N elements of a testing data set selected by the i-th choice. The output of the neural network model trained on the M input-output couples related to the i-th choice is represented by the symbol $$F^i_{(S_1, S_2, \ldots, S_{N_1})}.$$

The optimal string of the endogenous parameters ($S_1$, $S_2$, ..., $S_p$) of the model is the one that minimizes the functional $V_0(S_1, S_2, \ldots, S_p)$. For the minimum searching of this functional, any evolutionary algorithm may be used. For the tests so far carried out by the applicant, the PSOA (Particle Swarm Optimization Algorithm) [11] stochastic searching algorithm has been used.

Figure 3:
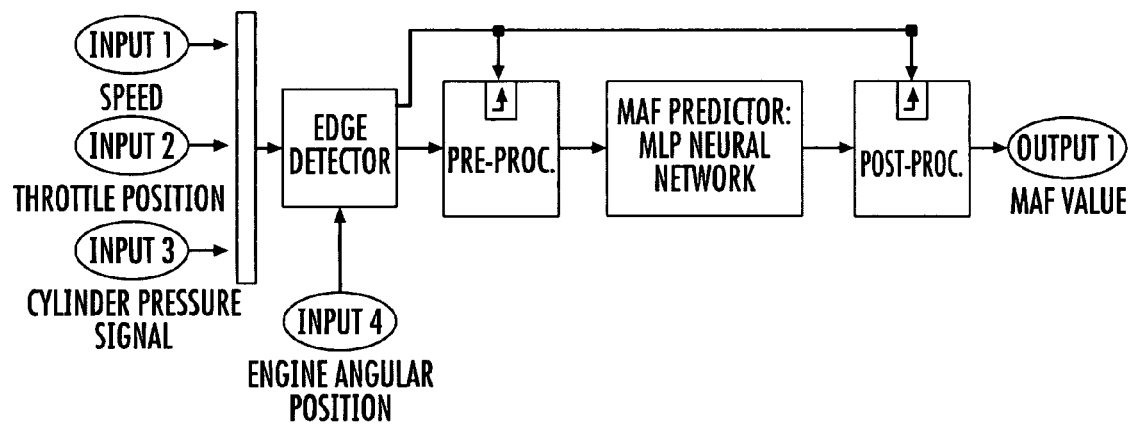
FIG. 3 is a block diagram of a preferred embodiment of the mass air flow sensor of this invention.

FIG. 3 describes the preferred embodiment of the MAF estimator block. The architecture of the MAF estimator is similar to that of the lambda sensor disclosed in the already cited prior European Patent application No. 05,425,121.0.

The MAF estimator has distinct sub-blocks for properly conditioning the input and output signals of the neural network.

The PRE-PROC sub-block pre-processes the model input data. The input data are transformed in dimensionless data with a zero mean and a unitary variance. Preferably, a PCA (Principal Component Analysis) transform is carried out on the dimensionless data. The POST-PROC sub-block performs the inverse of the previous transforms. The PRE-PROC sub-block and the POST-PROC sub-block effectively reduce the noise that may be corrupting the output signal of the mass air flow sensor core.

Finally, the EDGE DETECTOR sub-block enables or disables the model prediction according to the values of the input signal INPUT4 (i.e. the engine angular position). In particular, when the engine is at the TDC (Top Dead Center) at the end of the exhaust stroke (i.e. when the intake stroke is starting), the EDGE DETECTOR enables the model function until the engine angular position reaches 140 crank angle before TDC (Top Dead Center) in the compression stroke, when, for the considered test engine, the inlet and exhaust valves are simultaneously closed. This event happens when the inlet air charge reaches its maximum value.

The mass air flow estimated by the model is used for the calculation of the injection pulse for the combustion in the next engine cycle. In other words, the cylinder air charge estimated in the current engine cycle is used to predict the air charge for the next engine cycle. This introduces an inherent delay that becomes important when the engine is in transient conditions.

Set-Up of the MAF Estimator

An MLP neural network was used as model to predict the cylinder mass air flow for different engine conditions. The neural network was trained on an experimental data set including different engine speeds and loads as reported in the following table. In particular, three engine speeds (3000, 4600 and 5800 rpm) and, for each speed, eight throttle positions corresponding to different engine loads, have been considered. Lower engine speeds were ignored because the engine, used for the training of the model and for its validation, was a scooter engine which normally works at high engine speeds. The value of the mass air flow provided by a hot wire anemometer, mounted upstream of the intake manifold, was acquired for each of the twenty four different engine working conditions specified in Table 1.

TABLE 1

| | Speed (rpm) | throttle position (%) |
|---|---|---|
| 1 | 3000 | 3 |
| 2 | 3000 | 10 |
| 3 | 3000 | 20 |
| 4 | 3000 | 30 |
| 5 | 3000 | 40 |
| 6 | 3000 | 50 |
| 7 | 3000 | 70 |
| 8 | 3000 | 100 |
| 9 | 4600 | 3 |
| 10 | 4600 | 10 |
| 11 | 4600 | 20 |
| 12 | 4600 | 30 |
| 13 | 4600 | 40 |
| 14 | 4600 | 50 |
| 15 | 4600 | 70 |
| 16 | 4600 | 100 |
| 17 | 5800 | 3 |
| 18 | 5800 | 10 |
| 19 | 5800 | 20 |
| 20 | 5800 | 30 |
| 21 | 5800 | 40 |
| 22 | 5800 | 50 |
| 23 | 5800 | 70 |
| 24 | 5800 | 100 |

Injection Control Maps

The inputs of the block INJECTION CONTROL MAPS are the current speed of the engine and the value generated by the mass air flow sensor. The signal $I_{FF}$ represents the amount of fuel to be injected in the single cylinder of the engine for keeping the Air/Fuel ratio as close as possible to the stoichiometric value. The values of $I_{FF}$ are mapped in a look-up table determined in a preliminary calibration phase of the engine.

In practice, the feedforward control system of this invention varies the amount of fuel to be injected into the combustion chamber of the cylinder of the engine as a function of the aspired air flow.

Experimental Equipment

Figure 4:
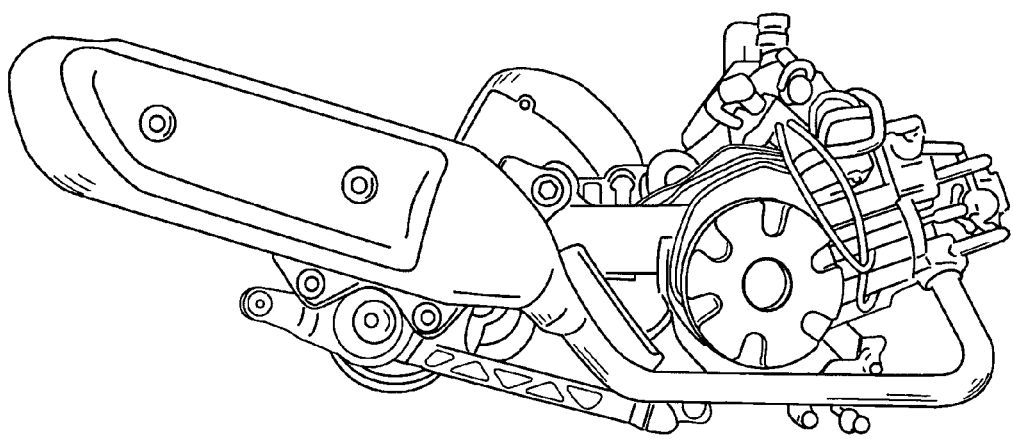
FIG. 4 depicts the Yamaha single cylinder four stroke engine YP125 used for tests carried out by the applicant.

The engine used both for the training of the mass air flow estimator of this invention and for its validation was a four stroke single cylinder SI engine Yamaha YP125 shown in FIG. 4, whose main features are shown in Table 2. The combustion engine in the test bench room was coupled to an asynchronous dynamometer APA 100 with a nominal power of 120 kW.

TABLE 2

| Type | One-cylinder 4 stroke |
|---|---|
| Ignition and Injection System | Electronic |
| Fuel System | Port injection |
| Displacement | 125 cm$^3$ |
| Bore | 53.7 mm |
| Stroke | 54.8 mm |
| Compression Ratio | 10.4:1 |
| Max Torque | 10 Nm @ 7500 rpm |
| Max Power | 8.5 kW @ 8750 rpm |

An optical encoder with high resolution (0.2 crank angle) was used for the determination of engine speed and piston position. The optical encoder ensured also the correct timing of the acquired pressure data. The electronic control of the engine was performed with a dSPACE Rapid Prototyping System, in which the engine control maps had been loaded. Using a graphical interface of the dSPACE system, it was possible to change in real time all the engine control parameters. The air charge estimator had been also loaded on the dSPACE system and one of its inputs was the amplified signal coming from a pressure transducer mounted in the cylinder head.

Functioning of the Mass Air Flow Sensor

Figure 5:
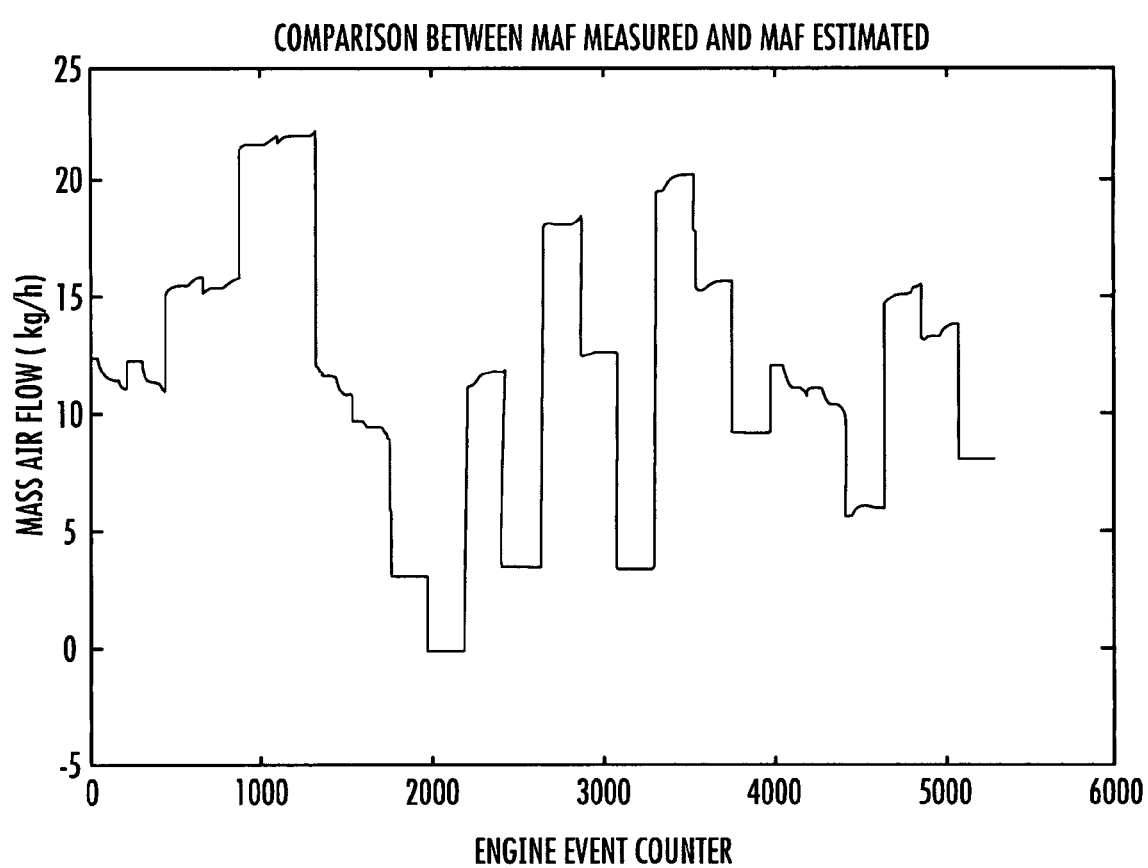
FIG. 5 is a graph of simulations of the mass air flow sensor of this invention for different functioning conditions of the Yamaha engine YP125 compared with the values sensed by a known mass air flow sensor in the same conditions.
Figure 6:
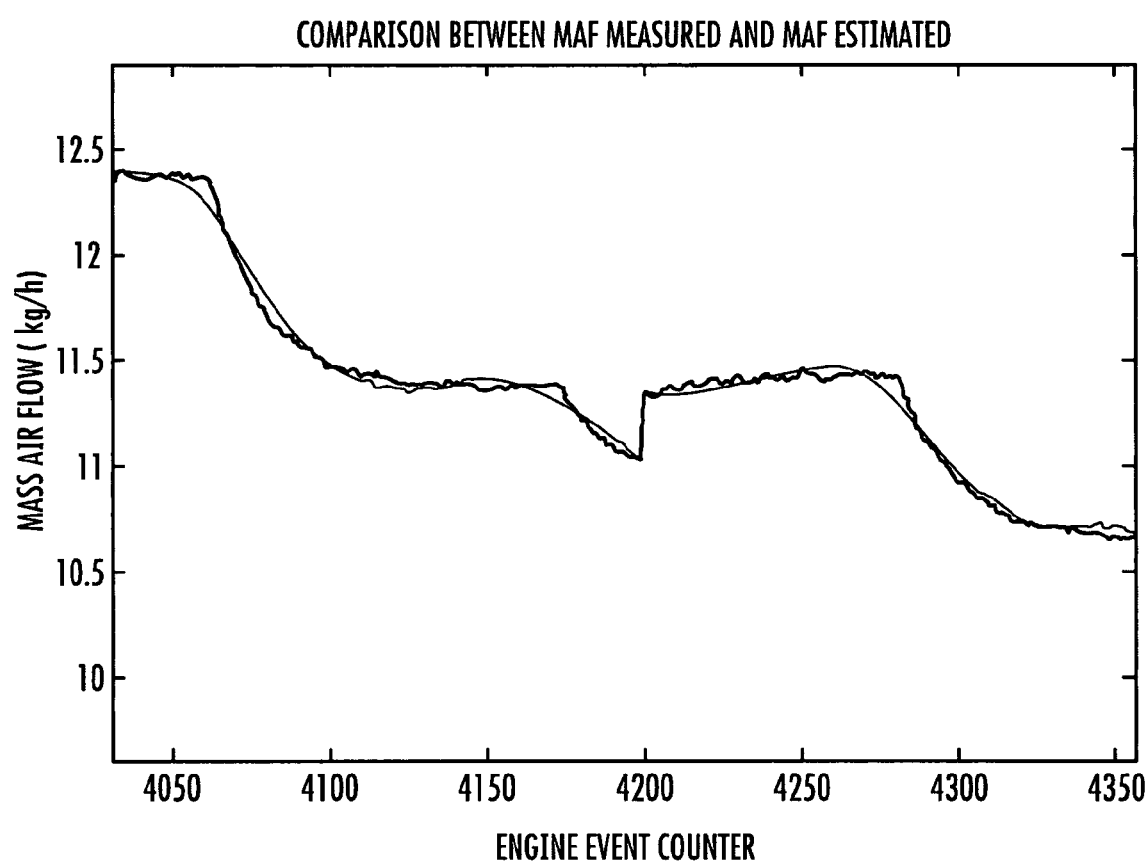
FIG. 6 is an enlarged view of a portion of the graphs of FIG. 5.
Figure 7:
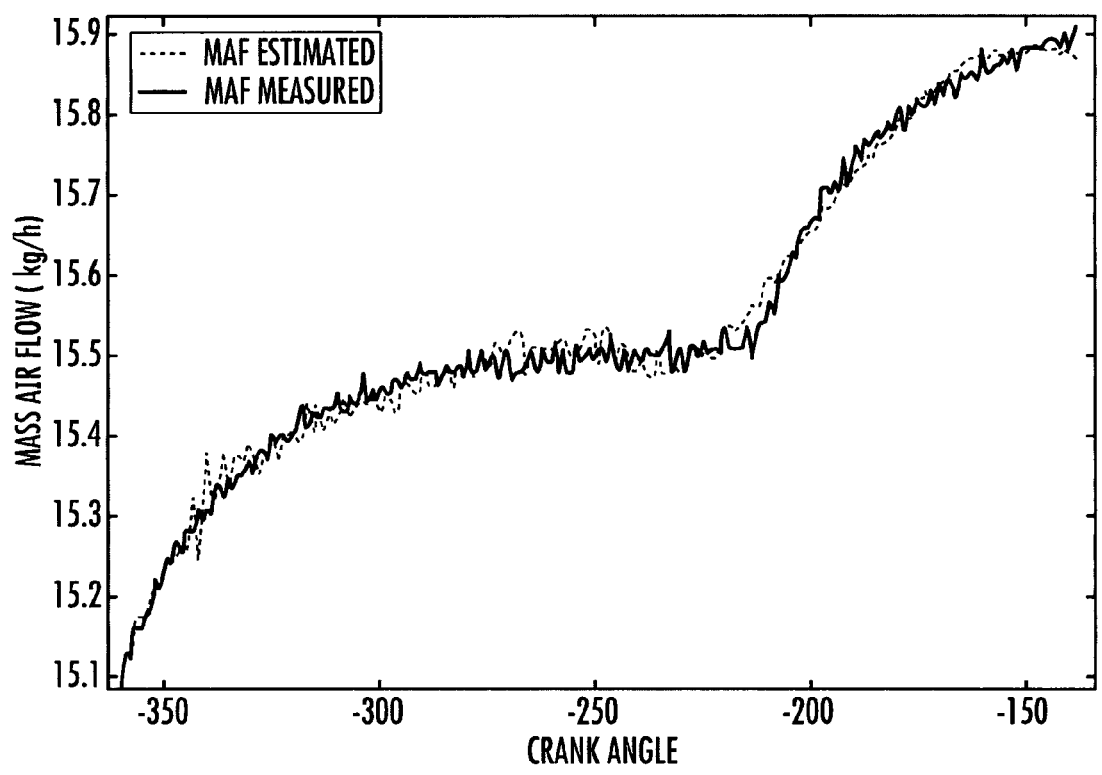
FIG. 7 compares the graphs of the mass air flow determined by the sensor of this invention and by a known sensor as a function of the crank angle when the engine is running at 4600 rpm and the throttle is 70% open.
Figure 8:
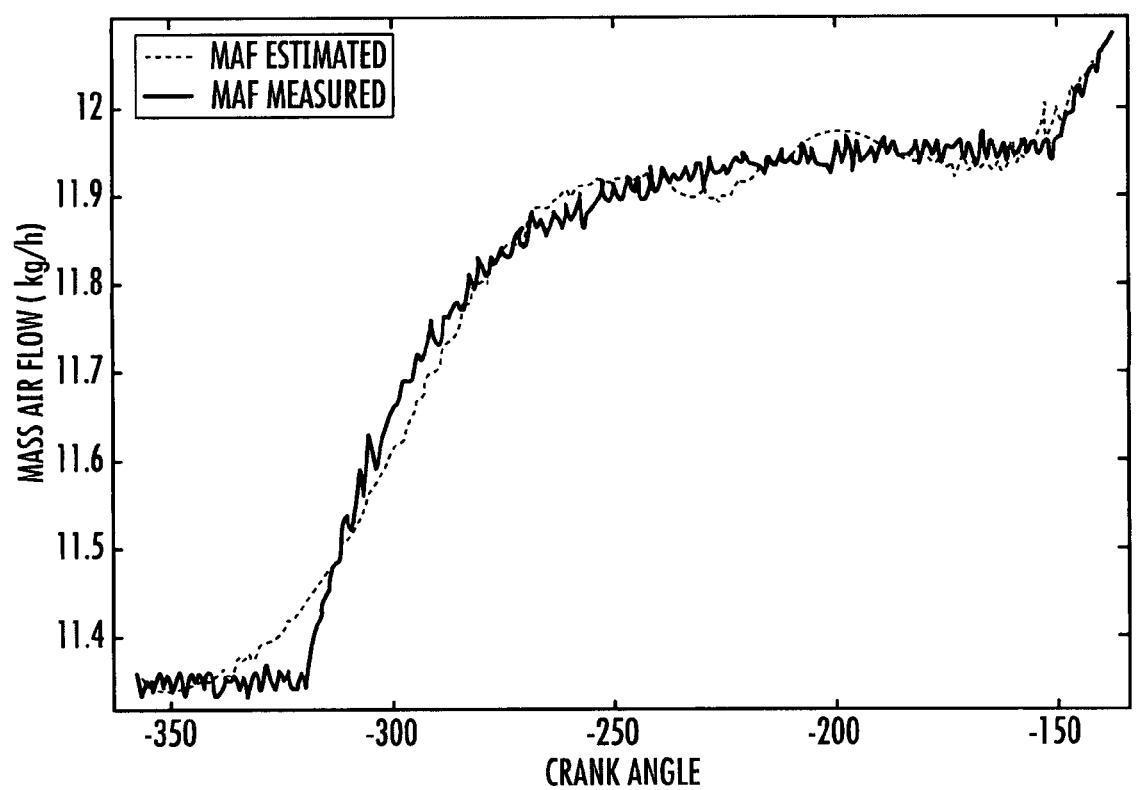
FIG. 8 compares the graphs of the mass air flow determined by the sensor of this invention and by a known sensor as a function of the crank angle when the engine is running at 4600 rpm and the throttle is 20% open.
Figure 9:
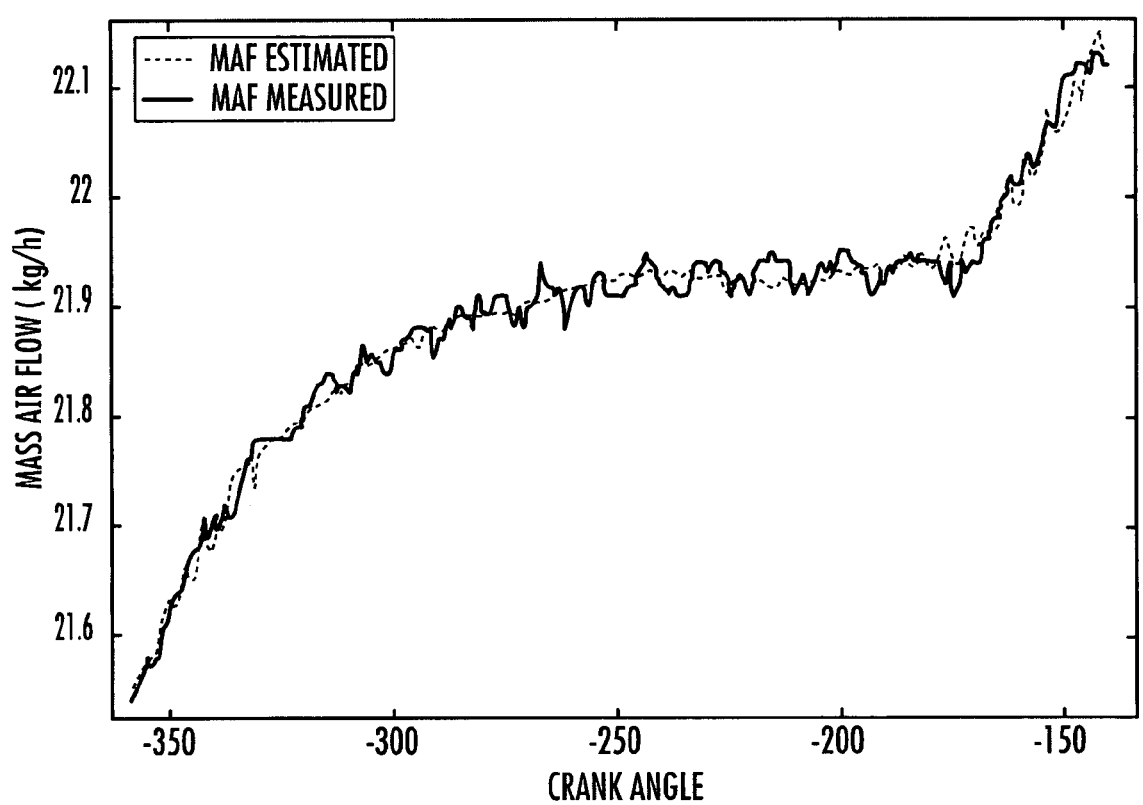
FIG. 9 compares the graphs of the mass air flow determined by the sensor of this invention and by a known sensor as a function of the crank angle when the engine is running at 5800 rpm and the throttle is 100% open.

FIG. 5 shows graphs of the values generated by the MAF sensor of this invention and a known MAF sensor (debimeter) installed in the same engine. The two graphs practically coincide, demonstrating that the differences between the values generated by the two systems are very small (the percentage mean square difference is smaller than 1%). FIG. 6 is an enlarged view of a portion of the graphs of FIG. 5, for better highlighting the tiny differences between the two graphs.

Experimental Tests

Experimental tests were carried out in order to gain information about the model capability to correctly estimate the amount of intake air, both in steady state and in transient conditions. In particular, for a running engine, a real time comparison was made between the output of the model and the value provided by the traditional hot wire anemometer.

Results in Steady State Conditions

Figure 10:
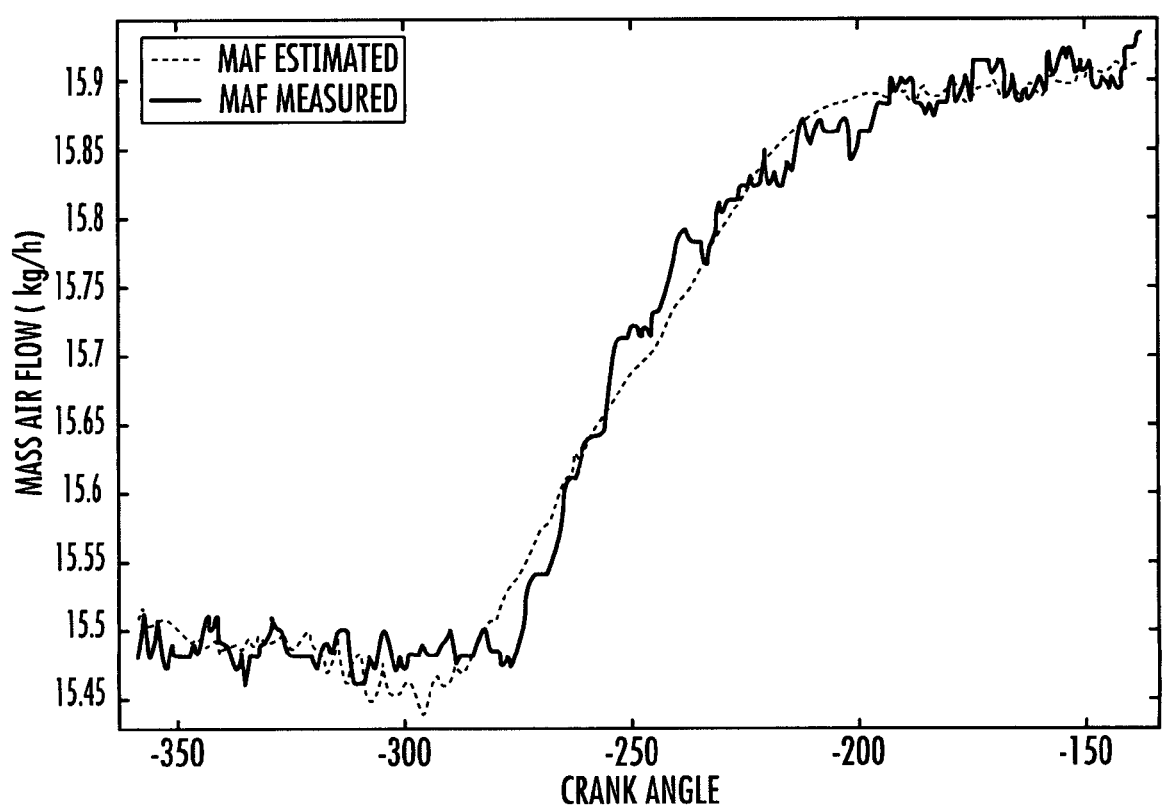
FIG. 10 compares the graphs of the mass air flow determined by the sensor of this invention and by a known sensor as a function of the crank angle when the engine is running at 5800 rpm and the throttle is 30% open.

In FIGS. 7 to 10, comparison graphs of the mass air flow values measured by means of a hot wire anemometer MAF sensor and the mass air flow values estimated by the soft computing estimator of this invention are shown. The figures refer to the engine in steady state run condition and they show the estimated and measured mass air flow for a single engine cycle. In particular, in FIG. 7 and in FIG. 8, the measured and the estimated mass air flows are compared for an engine speed of 4600 rpm and a throttle opening of 70% and 20% respectively, FIG. 9 and the FIG. 10 show the comparison at the engine speed of 5800 rpm and a throttle opening of 30% and 100% (wide open throttle condition), respectively.

These results confirm that the model is capable of providing an outstandingly good estimation of the intake air in steady state conditions, with a mean square error lower than 3% for all engine working conditions tested. The mean square error in the mass air flow estimation for each of the specified engine operating conditions is reported in Table 3.

TABLE 3

| Speed (rpm) | Throttle opening (%) | Mean square error |
|---|---|---|
| 4600 | 70 | 0.011 |
| 4600 | 20 | 0.029 |
| 5800 | 100 | 0.015 |
| 5800 | 30 | 0.010 |

Results in Transient Conditions

It is well known that under transient conditions, the dynamics of intake manifold filling/emptying play a significant role in the cylinder air charge determination. However, the soft computing model, employing the in-cylinder pressure signal as input, which contains information about the actual cylinder air charge, is not very sensitive to these dynamics and provides a good estimation of the intake air flow even during engine transients. At an engine speed of 3000 rpm, fast transient conditions were induced by opening the throttle from close to wide open position and back to the close position. Under these transient conditions, the mass air flow values measured by the hot wire anemometer sensor were acquired for 200 consecutive engine cycles.

Figure 11:
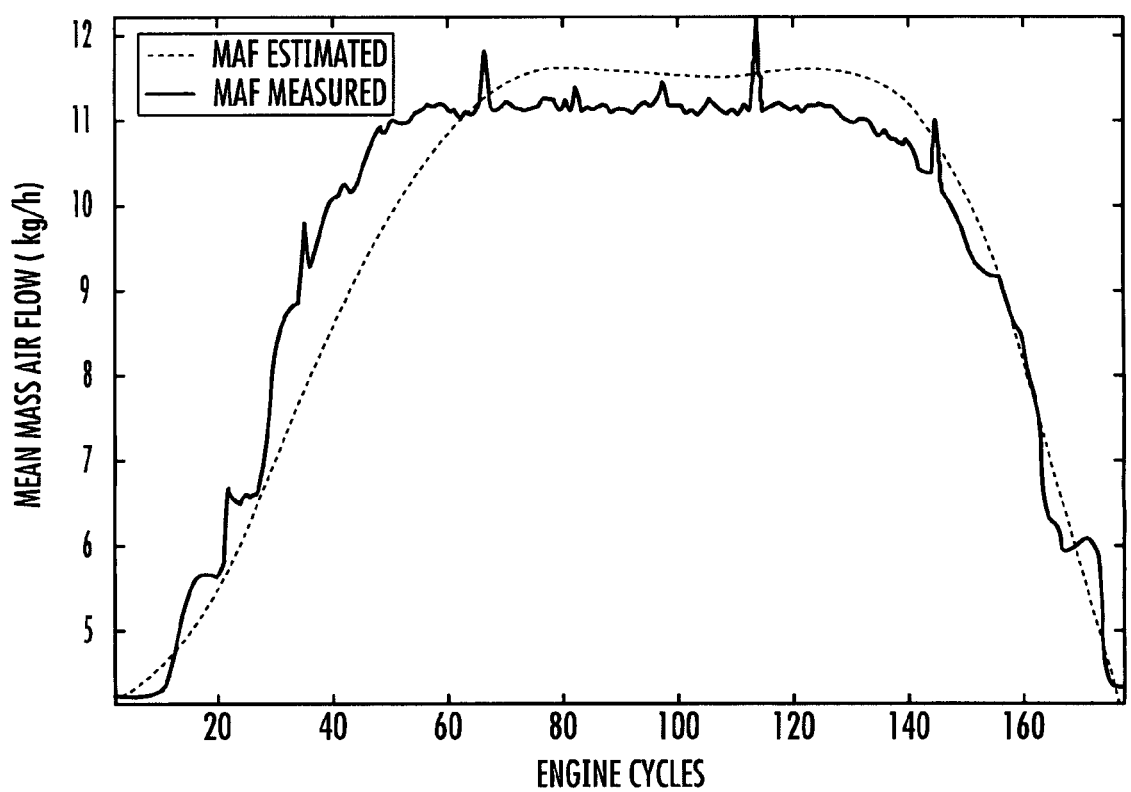
FIG. 11 compares the graphs of the mass air flow determined by the sensor of this invention and by a known sensor at 300 rpm during fast transient conditions varying the throttle opening from 0% to 100% and vice versa.

Comparison graphs between the value of the measured mass air flow (average value in the engine cycle) and the value (average value in the engine cycle) of the mass air flow estimated of the soft-computing estimator of this invention are shown in FIG. 11.

It may be observed that the measure provided by the physical sensor mounted upstream the intake manifold does not discriminate (compensate) the manifold filling/emptying dynamics, thus it may reasonably be regarded as not so accurate in the evaluation of the actual cylinder air charge, during fast transients. This could explain the differences between the values calculated on the basis of the physical sensor of air flow and those estimated according to the present invention.

In particular, according to FIG. 11, the mass air flow measurement by the anemometer appears to provide for a faster response to rapid throttle variations than the soft-computing mass air flow estimator of this invention. This appears to confirm that, during transients, the soft-computing mass air flow estimator of this invention intrinsically accounts for the contribution due to the air dynamics in the intake manifold, explaining the differences between the two graphs.

Figure 1:
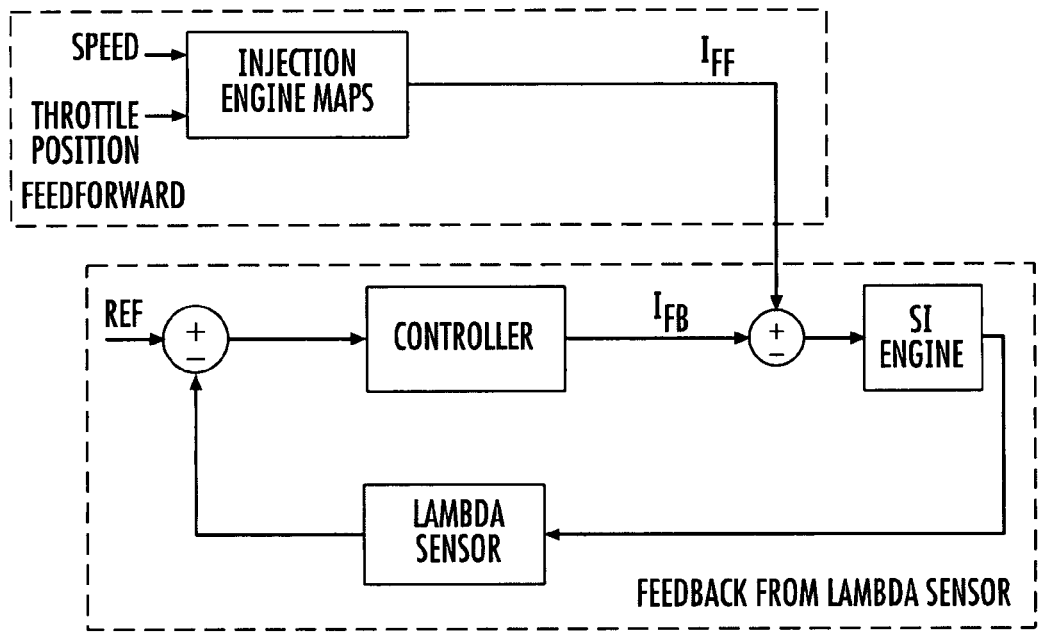
FIG. 1 shows a block diagram of the traditional air/fuel control system for a gasoline engine as in the prior art.

The feedforward control system of this invention may also be used in a feedback-and-feedforward control system such as that depicted in FIG. 1, even in conjunction with the virtual lambda sensor disclosed in the cited prior European Patent application No. 05,425,121.0. Such a joint control system would have a relatively low cost and would be capable of determining the amount of fuel to be injected in the combustion chamber of a cylinder as a function of both the estimated Mass Air Flow and of the lambda value of the engine.

The soft-computing mass air flow estimator of this invention is capable of providing real time estimation of the cylinder air charge, using a cylinder pressure sensor without the need of a relatively costly physical MAF sensors.

The same in-cylinder pressure sensor [6] [7] could be useful for a host of other functions in the electronic control of SI engines (e.g. misfire detection, knock detection, Air/Fuel control without lambda sensor, etc., [12], [13], [14], [15]).

Experimental tests on a single-cylinder engine have demonstrated the model effectiveness in estimating the mass air flow in steady state conditions. In transient conditions the model has revealed good but not fully demonstrated satisfactory performances in cylinder air charge estimation. A correct validation of the model even during fast transients will require more specific tests.

The applicants' approach, developed for a single cylinder engine, may be easily extended to SI engines with a plurality of cylinders. In this case, a mass air flow estimator for each cylinder of the engine using the relative combustion pressure signal may be implemented. In this way, even a different Air/Fuel control system for each cylinder of the engine could be implemented.

According to a preferred embodiment of the invention, the lambda sensor may be a virtual lambda sensor of the type described in the cited prior European Patent application No. 05,425,121.0.

REFERENCES

1. Heywood, J. B.,—"Internal combustion engine fundamentals"—McGraw-Hill Book Co., 1988.
2. Barbarisi, O., Di Gaeta, A., Glielmo, L., and Santini, S., "An Extended Kalman Observer for the In-Cylinder Air Mass Flow Estimation", MECA02 International Workshop on Diagnostics in Automotive Engines and Vehicles, 2001.
3. Grizzle, J. W., Cookyand, J. A., and Milam, W. P., "Improved Cylinder Air Charge Estimation for Transient Air Fuel Ratio Control", Proceedings of American Control Conference, 1994.
4. Jankovic, M., Magner, S. W., "Air Charge Estimation and Prediction in Spark Ignition Internal Combustion Engines", Proceedings of the American Conference, San Diego, Calif., June 1999.
5. Stotsky, I., Kolmanovsky, A., "Application of input estimation and control in automotive engines" Control Engineering Practice 10, pp. 1371-1383, 2002.
6. Sellnau, M. C., Matekunas, F. A., Battiston, P. A., Chang, C. F., and Lancaster, D. R., "Cylinder-Pressure-Based Engine Control Using Pressure-Ratio-Management and Low-Cost Non-Intrusive Cylinder Pressure Sensors", SAE paper 2000-01-0932, 2000.
7. Powell, J. D., "Engine control using cylinder pressure: Past, present and future", Journal of Dynamic Systems, Measurement and Control—Vol. 115, n° 2B, 1993.
8. Haykin, S., "Neural Networks: A comprehensive Foundation", Prentice Hall International Editions, Piscataway, 1999.
9. Craven, P., and Wahba, G., "Smoothing noisy data with spline functions: Estimating the correct degree of smoothing by the method of generalized crossvalidation", Numerische Mathematik, vol. 31, pag. 377-403, 1979.
10. Vapnik, V. N., "An overview of Statistical Learning Theory", IEEE Trans. On Neural Networks, vol. 9, 1999.
11. Eberhart, R. C. and Kennedy, J. "A new optimizer using particle swarm theory", Proceedings of the sixth international symposium on micro machine and human science pp. 39-43. IEEE service center, Piscataway, N.J., Nagoya, Japan, 1995.
12. Cesario, N., Di Meglio, M., and Pirozzi, F., "Realization of a Virtual Lambda Sensor on a Fixed Precision System", published in IEEE Proceedings of the DATE05 (Design, Automation and Test in Europe) International Conference—Designer's Forum.
13. Pirozzi, F., Cesario, N. and Lavorgna, M., "Modelling On-Off Virtual Lambda Sensors based on Multi-Spread Probabilistic Neural Networks", proposed to the 10th IEEE International Conference on Emerging Technologies and Factory Automation (ETFA05), 19-22 Sep. 2005, Catania, Italy.
14. Cesario, N., Di Meglio, M., Pirozzi, F., Moselli, G., Taglialatela, F., Carpentieri, F., "Air/Fuel Control System in SI Engines based on a Virtual Lambda Sensor", SAE-ICE2005 7-th International Conference On Engine for Automobiles, SAE paper 2005-24-058.
15. Taglialatela, F., Moselli, G. and Lavorgna, M., "Engine Knock Detection and Control Using In-Cylinder Pressure Cycle and Soft Computing Techniques", SAE-ICE2005 2005 7-th International Conference On Engine for Automobiles, SAE paper 2005-24-061.

DEFINITIONS, ACRONYMS, ABBREVIATIONS

ATDC: After TDC
BTDC: Before TDC
EGR: Exhaust Gas Recirculation
MAF: Mass Air Flow
MAP: Manifold Absolute Pressure
MLP: Multi Layer Perceptron
PCA: Principal Component Analysis
PSOA: Particle Swarm Optimization Algorithm
SI: Spark Ignition
TDC: Top Dead Center That which is claimed is:

1. A method of estimating inlet air flow in a combustion chamber of a cylinder of an internal combustion engine, the method comprising:
   providing an adaptive controller;
   training the adaptive controller to reproduce an operation of a mass air flow physical sensor;
   sensing at least a pressure in the combustion chamber of the cylinder of the engine and generating a cylinder pressure signal;
   extracting characteristic parameters of the cylinder pressure signal; and
   using the adaptive controller to generate an estimated signal representative of the inlet air flow in the combustion chamber based upon the characteristic parameters.

2. The method of claim 1, wherein providing the adaptive controller comprises providing a learning machine implemented with soft-computing techniques.

3. The method of claim 1, wherein the adaptive controller is input with at least one of an engine throttle position signal, an engine speed signal, an engine drive shaft angular position signal, and the cylinder pressure signal.

4. A method of determining inlet air flow in a combustion chamber of a cylinder of an internal combustion engine, the method comprising:
   providing an mass air flow predictor trained to reproduce an operation of a mass air flow physical sensor;
   sensing a pressure in the combustion chamber of the cylinder of the engine and generating a cylinder pressure signal; and
   using the adaptive controller to generate an estimated signal representative of the inlet air flow in the combustion chamber based upon the cylinder pressure signal.

5. The method of claim 4, further comprising extracting characteristic parameters of the cylinder pressure signal; wherein the adaptive controller generates the estimated signal based upon the characteristic parameters.

6. The method of claim 4, wherein providing the adaptive controller comprises providing a learning machine implemented with soft-computing techniques.

7. The method of claim 4, wherein the adaptive controller is input with at least one of an engine throttle position signal, an engine speed signal, an engine drive shaft angular position signal, and the cylinder pressure signal.

8. An inlet air flow estimator for a combustion chamber of a cylinder of an internal combustion engine, the estimator comprising:
- a pressure sensor generating a pressure signal of a pressure in the combustion chamber of the cylinder of the engine; and
- a trained adaptive controller input with at least the cylinder pressure signal to generate an estimated signal representative of the inlet air flow in the combustion chamber of the engine based upon at least characteristic parameters of the pressure signal.

9. The estimator of claim 8 wherein said trained adaptive controller comprises:
- an enabling/disabling unit for enabling the estimator when a drive shaft angular position is within a range corresponding to a start position and an end position of an aspiration phase;
- a pre-processor downstream from the enabling/disabling unit and for generating a signal representing an average of at least the characteristic parameters of the cylinder pressure signal;
- a neural network downstream from the pre-processor and for generating an intermediate signal indicative of the inlet air flow; and
- a post-processor input with the intermediate signal and for generating the estimate signal as an average of the intermediate signal.

10. The estimator of claim 9, wherein said pre-processor further generates signals representing averages of an engine speed and an engine throttle position, and said neural network generates the intermediate signal based upon the signals generated by the pre-processor.

11. The estimator of claim 9, wherein said enabling/disabling unit enables and disables the estimator when a crank angle of the engine is −360 degrees and −140 degrees, respectively.

* * * * *